US005686042A

United States Patent [19]
Slack et al.

[11] Patent Number: 5,686,042
[45] Date of Patent: Nov. 11, 1997

[54] RIM PROCESS USING LIQUID METHYLENE DIPHENYL DIISOCYANATE

[75] Inventors: William E. Slack, Moundsville; Hersel T. Kemp, II, New Martinsville, both of W. Va.; David D. Steppan, Gibsonia, Pa.

[73] Assignee: Bayer Corporation, Pittsburgh, Pa.

[21] Appl. No.: 484,618

[22] Filed: Jun. 7, 1995

[51] Int. Cl.$^6$ .............................. C08G 18/08; C08G 18/10
[52] U.S. Cl. .............................. 264/328.6; 521/129
[58] Field of Search .............................. 264/300, 328.6, 264/45.5; 521/51, 129

[56] References Cited

U.S. PATENT DOCUMENTS

| | | |
|---|---|---|
| 3,644,457 | 2/1972 | König et al. . |
| 4,055,548 | 10/1977 | Carleton et al. . |
| 4,115,429 | 9/1978 | Reiff et al. . |
| 4,118,411 | 10/1978 | Reiff et al. . |
| 4,160,080 | 7/1979 | König et al. ............... 528/59 |
| 4,218,543 | 8/1980 | Weber et al. ............... 264/45.5 |
| 4,261,852 | 4/1981 | Carroll et al. ............... 528/59 |
| 4,490,300 | 12/1984 | Allen et al. . |
| 4,490,301 | 12/1984 | Pantone et al. . |
| 4,490,302 | 12/1984 | Ma et al. . |
| 4,738,991 | 4/1988 | Narayan ............... 521/124 |
| 4,866,103 | 9/1989 | Cassidy et al. ............... 521/159 |
| 4,910,333 | 3/1990 | Slack ............... 560/351 |
| 5,302,303 | 4/1994 | Clatty et al. ............... 521/129 |
| 5,319,053 | 6/1994 | Slack et al. ............... 528/48 |
| 5,319,054 | 6/1994 | Slack et al. ............... 528/48 |

FOREIGN PATENT DOCUMENTS

| | | |
|---|---|---|
| 48-62745 | 9/1973 | Japan . |
| 994890 | 6/1965 | United Kingdom . |

*Primary Examiner*—Mathieu D. Vargot
*Attorney, Agent, or Firm*—Joseph C. Gil; N. Denise Brown

[57] ABSTRACT

The present invention relates to a process for the production of molded articles via the reaction injection molding technique. According to the RIM process, a reaction mixture is introduced into a closed mold, allowed to react fully, and removed from the mold. More specifically, these reaction mixtures comprise an isocyanate-reactive material, a chain extender, and a stable, liquid diallophanate modified diphenylmethane diisocyanate (MDI). Two specific processes for the preparation of the suitable diallophanate modified diisocyanate are disclosed. These diallophanate modified isocyanates either have an isocyanate group content from about 12 to 30%, or from about 5 to 29%.

13 Claims, No Drawings

RIM PROCESS USING LIQUID METHYLENE DIPHENYL DIISOCYANATE

BACKGROUND OF THE INVENTION

The present invention relates to a process for producing molded articles from a reaction mixture comprising a novel isocyanate via the reaction injection molding technique. More specifically, the reaction mixtures suitable for the present invention contain liquid diallophanate-modified MDI prepolymers.

Liquid methylene diphenyl diisocyanates are generally known in the art. U.S. Pat. No. 3,644,457 discloses room temperature stable liquid isocyanates derived from one mole of diphenylmethane diisocyanate and 0.1 to 0.3 moles of poly-1,2-propylene ether glycol.

U.S. Pat. No. 4,055,548 discloses liquid isocyanate prepolymer compositions obtained by reacting polymethylene polyphenylisocyanate containing from about 65 to 85 percent by weight of methylene bis(phenyl)-isocyanate with a polyoxyethylene glycol having molecular weight of from 200 to 600 in an equivalent ratio of 0.0185 to 0.15:1.

U.S. Pat. Nos. 4,115,429 and 4,118,411 disclose low temperature (as low as −5 degrees Centigrade), storage stable liquid diphenylmethane diisocyanates which are produced by reacting diphenylmethane diisocyanates having a specified 2,4'-isomer content with propylene glycol or poly-1,2-propylene ether glycol.

U.S. Pat. No. 4,261,852 discloses liquid polyisocyanate compositions comprising (A) the reaction product of 90 to 50% by weight of a reaction product of diphenylmethane diisocyanate and a polyoxypropylene diol or triol having hydroxyl equivalent weight of from 750 to 3000, said reaction product having an NCO content of from 8 to 26% by weight, and (B) from about 10 to 50% by weight of a diphenylmethane diisocyanate containing from 30 to 65% by weight of diphenylmethane diisocyanate, the remainder being polymethylene polyphenyl polyisocyanate.

U.S. Pat. No. 4,490,300 discloses room temperature stable liquid isocyanates which are derived by reacting diphenylmethane diisocyanate with an aliphatic diol having a pendant aromatic group, e.g., 2-methyl-2-phenyl-1,3-propanediol or phenyl-1-2-ethanediol.

U.S. Pat. No. 4,490,301 discloses room temperature stable liquid isocyanates which are derived by reacting diphenylmethane diisocyanate with monoallylether of trimethylolpropane.

Liquid diphenylmethane diisocyanate compositions are also disclosed in U.S. Pat. No. 4,490,302. These are prepared by reacting diphenylmethane diisocyanate with a mixture of (i) a monohydroxyl alcohol, (ii) a poly-1,2-propylene ether glycol having a molecular weight of 134 to 700, and (iii) a trihydroxyl alcohol selected from the group consisting of trimethylolpropane, triethylolpropane, glycerin, and 1,3,6-hexane triol.

U.S. Pat. No. 4,910,333 discloses a process for preparing liquid modified isocyanate comprising reacting (i) diphenylmethane diisocyanate, (ii) an organic material containing two or more hydroxyl groups, and forms a solid product at 25° C. when reacted with MDI in an amount such that the solid product has an isocyanate group content of from 10 to 30% by weight, and (iii) from 1 to 6% by weight, based on the weight of (i), (ii), and (iii), of tripropylene glycol. The quantity of (i), (ii), and (iii) is such that the resultant product is both stable and liquid at 25° C., and has an isocyanate group content of from about 10 to 30% by weight.

U.S. Pat. No. 4,738,991 discloses organic polyisocyanates characterized by allophanate linkages which are prepared by reacting an organic polyisocyanate, including 2,4'- and 4,4'-methylenediphenyl diisocyanate, with poly- or monohydric alcohol in the presence of an organo metallic catalyst. The catalyst is then deactivated using a compound such as an inorganic acid, organic acid, organic chloroformate or an organic acid chloride.

U.S. Pat. No. 4,866,103 discloses a polyisocyanate composition for use in producing elastomers in a RIM process, said composition being the product of reacting an alcohol and/or thiol having an average functionality of from about 1.5 to about 4 and an average equivalent weight of at least 500 with at least 2 equivalents per hydroxyl and/or thiol equivalent of an organic polyisocyanate, including 4,4'- and 2,4'-isomers of diphenyl methane diisocyanate, under such conditions that at least about 20% of the initially formed urethane and/or thiourethane groups are converted to allophanate and/or thioallophanate groups.

Other patents relating to the preparation of allophanates which contain isocyanates are British Patent 994,890 which relates to the reaction of urethane isocyanates with excess diisocyanate either by heat alone or in the presence of a catalyst such as a metal carboxylate, a metal chelate or a tertiary amine, until the isocyanate content is reduced to that which is obtained theoretically when the complete reaction of the urethane groups is achieved.

U.S. Pat. No. 4,160,080 discloses a process for producing allophanate containing aliphatically and/or cycloaliphatically bound isocyanate groups in which compounds containing urethane groups are reacted with polyisocyanates having aliphatic and/or cycloaliphatic isocyanate groups in the presence of a strong acid. The process is generally conducted at a temperature of from 90° C. to 140° C. for about 4 to 20 hours.

Japanese Patent Application No. 1971-99176 discloses a method of preparing liquid diphenylmethane diisocyanate by reacting diphenylmethane diisocyanate with aliphatic monovalent alcohol.

A process for the production of diallophanate-modified MDI which is storage-stable at 25° C. is disclosed in U.S. Pat. No. 5,319,054. Although this patent broadly discloses that these allophanate-modified MDI prepolymers are suitable for use in a RIM process, there is no suggestion that the products prepared via a RIM process using these allophanate-modified MDI would exhibit improved mechanical properties.

U.S. Pat. No. 5,319,053 is directed to a stable, liquid MDI prepolymer. This liquid prepolymer comprises an alcohol-based, allophanate-modified MDI prepolymers having an isocyanate content of about 12 to 32.5% and is characterized in that the allophanate is a reaction product of an aliphatic alcohol and a specified isomer composition of MDI containing from 2 to 60% of the 2,4'- isomer, less than 6% of the 2,2'-isomer, and the balance is the 4,4'-isomer.

It is also possible according to another embodiment in U.S. Pat. No. 5,319,053 that this stable, liquid MDI prepolymer has an isocyanate content of 5 to 30%. In this embodiment, the prepolymer comprises the reaction product of the allophanate described above, and an organic material containing at least two active hydrogen groups, and/or a low molecular weight diol. The organic material containing active hydrogen groups may be one wherein these groups are hydroxyl groups, primary amine groups, secondary amine groups, or combinations thereof.

Copending application Ser. No. 08/116,141, filed on Sep. 2, 1993, which is commonly assigned, discloses that RIM processing of the stable, liquid MDI prepolymers described in U.S. Pat. No. 5,319,053 yields molded products which exhibit a high flex modulus. These stable, liquid MDI prepolymers contain allophanate groups and possibly urethane groups.

By the present invention there is provided a RIM process for the production of molded articles from a reaction mixture comprising a novel liquid isocyanate. The molded parts produced from this process exhibit improved flex modulus. Because these prepolymers yield elastomers with improved flex modulus, lower levels of fast reacting chain extenders are required to reach a given stiffness. This allows the filling of larger tools at a given machine throughput due to the longer gel time. This is important as RIM tools become larger and require a larger metering unit if system reactivity can not be reduced.

DESCRIPTION OF THE INVENTION

The present invention relates to polyurethane moldings produced by the reaction injection molding (RIM) process. This process comprises the steps of introducing a reaction mixture into a closed mold, allowing said reaction mixture to fully react, and removing the molded article from the mold. The reaction mixture has an isocyanate index of from about 80 to 120 and comprises an isocyanate-reactive material, a chain extender, and a stable, liquid diallophanate-modified diphenylmethane diisocyanate. These diallophanate-modified diphenylmethane diisocyanates can be prepared by two different methods. The first method comprises 1) (a) reacting:
   (i) one equivalent of a diisocyanate, with
   (ii) one equivalent of an aliphatic alcohol containing 1 to 36 carbon atoms, preferably 2 to 16 carbon atoms, or aromatic alcohol containing 6 to 18 carbon atoms, preferably 6 to 12 carbon atoms, wherein the hydroxyl group is directly attached to the aromatic ring to form a diurethane of the diisocyanate, (b) reacting the diurethane formed in (a) with a diphenylmethane diisocyanate isomer composition containing from 0 to 60% (preferably 0 to 30%, and most preferably 1 to 10%) by weight of 2,4'-diphenylmethane diisocyanate, and less than 6% (preferably less than 3%, and most preferably less than 1%) by weight of 2,2'-diphenylmethane diisocyanate and the remainder being 4,4'-diphenylmethane diisocyanate, in the presence of an allophanate catalyst to yield the stable, liquid diallophanate modified diphenylmethane diisocyanate, followed by the addition of a catalyst stopper.

The stable, liquid diallophanate-modified diphenylmethane diisocyanate prepared according to this method has an isocyanate group content of from 12.0 to 30.0%, preferably from 17 to 28%, and most preferably from 17 to 24%.

It is also possible to prepare these diallophanate-modified diphenylmethane diisocyanates by the alternate method of 2) (a) reacting:
   (i) one equivalent of a diisocyanate, with
   (ii) one equivalent of an aliphatic alcohol containing 1 to 36 carbon atoms, preferably 2 to 16 carbon atoms, or aromatic alcohol containing 6 to 18 carbon atoms, preferably 6 to 12 carbon atoms, wherein the hydroxyl group is directly attached to the aromatic ring to form a diurethane of the diisocyanate;

(b) reacting the diurethane formed in step 2)(a) with a diphenylmethane diisocyanate isomer composition containing from 0 to 60% (preferably 0 to 30%, and most preferably 1 to 10%) by weight of 2,4'-diphenylmethane diisocyanate, and less than 6% (preferably less than 3%, and most preferably less than 1%) by weight of 2,2'-diphenylmethane diisocyanate, with the remainder being 4,4'-diphenylmethane diisocyanate, in the presence of an allophanate catalyst to yield a diallophanate-modified diphenylmethane diisocyanate having an isocyanate group content of from 12.0 to 30%, followed by the addition of a catalyst stopper, and (c) reacting the diallophanate-modified diphenylmethane diisocyanate having an isocyanate group content of from 12.0 to 30.0%, with a compound selected from the group consisting of: (i) an organic material containing about 1.8 or more hydroxy, primary amine or secondary amine groups or any combination thereof, having a molecular weight of from 400 to 6000, preferably of from 500 to 5200, and most preferably of from 1000 to 4800, (ii) a diol having a molecular weight of from 60 to 200, preferably of from 76 to 192, and most preferably of from 76 to 150 and (iii) mixtures of (i) and (ii).

This method forms a stable, liquid diallophanate modified isocyanate having an isocyanate group content of from 5 to 29%, preferably of from 9 to 27%, and most preferably of from 12 to 21%.

In accordance with the foregoing, the present invention, in the first embodiment, encompasses a process for the production of molded parts via the RIM process from a reaction system comprising an isocyanate-reactive material, a chain extender, and a diallophanate-modified MDI which is a storage stable liquid at 25° C. The diallophanate-modified MDI is prepared by (a) reacting (i) one equivalent of a diisocyanate selected from the group consisting of hexamethylene diisocyanate (HDI), isophorone diisocyanate (IPDI), toluene diisocyanate (TDI), diphenylmethylene diisocyanate (MDI), and hydrogenated MDI with (ii) one equivalent of an aliphatic alcohol containing 1 to about 36 carbon atoms or aromatic alcohol containing 6 to 18 carbon atoms to form a diurethane of the diisocyanate, (b) reacting the product of (a) with a specified isomer composition of diphenylmethane diisocyanate in an amount sufficient to provide a liquid diallophanate-modified MDI having an NCO content of about 12.0 to 30.0%. Typically, the diphenylmethane diisocyanate isomer composition contains 4,4'-diphenylmethane diisocyanate, from 0 to 60%, and preferably from 1 to 60% by weight 2,4'-MDI and less than 6% by weight of the 2,2'-MDI.

In the second embodiment, the present invention encompasses the RIM process as recited above, wherein the diallophanate-modified MDI has been further modified. In particular, diallophanate-modified MDI having an isocyanate group content of from 12.0 to 30.0% is reacted with at least one compound selected from the group consisting of (i) an organic material containing about 1.8 or more hydroxy, primary amine or secondary amino groups or any combination thereof having a molecular weight of from 400 to 6000, (ii) a diol having a molecular weight of from 60 to 200, and (iii) mixtures thereof, wherein the resultant liquid prepolymer has an isocyanate group content of from 5 to 29% by weight.

It is a distinct feature that the resultant diallophanate-modified MDI prepolymers which are suitable for use in the present process are stable and liquid at 25° C. By the term "stable" herein is meant that the isocyanate has no more than one percent absolute change in NCO content and no more than ten percent change in the viscosity when stored at 25°

C. for 3 months. By the term "liquid" herein is meant that the modified isocyanate does not precipitate solids when stored at 25° C. for 3 months.

Particularly useful applications for the molded products produced by this process include, for example, automotive reaction injection molding (RIM), shoe soles and rigid foam applications.

In the first method of preparing the suitable diallophanate compounds to be used in the present invention, the prepolymer containing diallophanate-modified MDI is characterized in that it is stable and liquid at 25° C. and has an isocyanate content of about 12 to 30%, preferably 17 to 28%, and most preferably 17 to 24% by weight. In the second method of preparing the suitable diallophanate compounds to be used in the present invention, the diallophanate-modified MDI is characterized in that it has an isocyanate group content of about 5 to 29%, preferably 9 to 27%, and most preferably 12 to 21% by weight. The diallophanate-modified MDI can be prepared by reacting a diisocyanate with an aliphatic or aromatic alcohol in order to produce a diurethane, followed by reacting the diurethane with the specified MDI isomer composition to form a diallophanate. More specifically, the diurethane of the diisocyanate can be obtained by reacting one equivalent of a diisocyanate with one equivalent of an aliphatic alcohol containing 1 to about 36, preferably about 2 to 16 carbon atoms, or with an aromatic alcohol containing about 6 to 18, preferably about 6 to 12 carbon atoms wherein the hydroxyl group is directly attached to the aromatic ring.

Suitable diisocyanates according to the present invention include all of the known diisocyanates. It is preferred that the diisocyanate is selected from the group consisting of hexamethylene diisocyanate (HDI), isophorone diisocyanate (IPDI) toluene diisocyanate (TDI), diphenylmethylene diisocyanate (MDI), and hydrogenated MDI.

Aliphatic alcohols useful herein include those that can react with the diisocyanate to form the diurethane which can then be converted to an allophanate in accordance with the invention. The useful aliphatic alcohols can contain about 1 to 36 and preferably 2 to 16 carbon atoms. Illustrative but non-limiting examples of the aliphatic alcohols can be selected from the group consisting of cycloaliphatic alcohols, aliphatic alcohols containing aromatic groups, and aliphatic alcohols containing groups that do not react with isocyanates, e.g. ether groups and halogens such as bromine and chlorine. Suitable compounds include, for example, aliphatic alcohols such as 1-butanol, cetyl alcohol, 2-methoxyethanol and 2-bromoethanol. Ethanol, the isomeric butanols, and the isomeric pentanols are preferred aliphatic alcohols.

Suitable examples of the aromatic alcohols include phenol, 1-naphthol, and substituted phenols such as cresol, and substituted naphthols such as 3-methyl-1-naphthol. Preferred aromatic alcohols are phenol and the substituted phenols.

In the reaction of the aliphatic or aromatic alcohol with the diisocyanate, the NCO to OH equivalent ratio is about 1:1 with the reaction being monitored until preferably 80%, more preferably 90%, and most preferably 95% of the NCO groups have reacted and converted to the urethane groups. Solvents which are typically inert to the isocyanate such as, for example, toluene, tetrahydrofuran, o-dichlorobenzene or the like can be employed.

In accordance with the invention, the process comprises reacting the resulting diurethane with the specified isomer composition of diphenylmethane diisocyanate in an amount sufficient to provide a diallophanate having an isocyanate group content of about 12.0 to 30.0%. As set forth above, the isomer composition of the diphenylmethane diisocyanate comprises about 0 to 60%, preferably 0 to 30%, and most preferably 1 to 10% by weight 2,4'-diphenylmethane diisocyanate and less than 6%, preferably less than 3%, and most preferably less than 1.0% by weight of the 2,2'-diphenylmethane diisocyanate, and the rest being 4,4'-diphenylmethane diisocyanate.

The diallophanate-forming reaction is usually conducted in the presence of a catalyst. The useful catalysts are those which can be neutralized or otherwise stopped from adversely catalyzing subsequent reactions. Illustratively, a catalyst such as zinc acetylacetonate can be employed, and a catalyst stopper such as acidic materials, e.g., anhydrous hydrochloric acid, sulfuric acid, benzoyl chloride, bis(2-ethylhexyl)phosphate, Lewis acids and the like in the ratio of 2 equivalents of the acid to each mole of the zinc acetylacetonate may be used. Other allophanate catalysts such as zinc 2-ethylhexanoate, cobalt 2-ethyl-hexanoate, cobalt naphthanate, lead linoresinate, stannous octoate, or the like can be employed.

In a preferred embodiment of the process of the invention, the diallophanate can be prepared by reacting the diisocyanate, as described above, with an aliphatic or aromatic alcohol, at about 20° C. to about 115° C. The resultant diurethane is dissolved in the specified MDI isomer composition and converted to an diallophanate modified MDI at 90° to 110° C., using zinc acetylacetonate as catalyst and benzoyl chloride as a stopper for the catalyst in a 2:1 weight ratio of benzoyl chloride to zinc acetylacetonate.

In the second embodiment of the invention, the process further to the afore-described process steps comprises reacting the diallophanate-modified MDI such as described above with a high and/or a low molecular weight organic material containing about 1.8 or more, and preferably 2 to 3 active hydrogen groups such as hydroxyl, primary or secondary amino groups or the like. The high molecular weight organic material can have a molecular weight from 400 to 6000, preferably 500 to 5200, and most preferably 1000 to 4800. The weight range of the low molecular weight material can be from 60 to 200, preferably 76 to 192, and most preferably 76 to 150.

The subject urethane, urea, or biuret reaction is carried out in a manner which is well known by, for example, heating the reactants to a temperature from about 40° to 150° C, preferably from 50° to 100° C. to form urethane or urea, and heating to a temperature of 100° to 150° C., preferably 110° to 120° C., to form the biuret.

The useful organic materials containing about 1.8 or more hydroxyl groups having a molecular weight of 400 to 6000 can be a polyol selected from the group consisting of polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethlylolpropane. The polyesters may also contain a portion of carboxyl end groups. Polyesters of lactones, e.g. ε-caprolactone or hydroxyl carboxylic acids, e.g. ω-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2, 4-butane triol, trimethylol ethane, pentaerythritol, mannitol, sorbitol, methyl glycoside, sucrose, phenol, isononyl phenol, resorcinol, hydroquinone, and 1,1,1- or 1,1,2-tris-(hydroxylphenyl)-ethane.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythiomixed ethers, polythioether esters or polythioether ester amides, depending on the co-components.

Amine-terminated polyethers useful herein can be prepared by reacting a primary amine with polyether containing terminal leaving groups such as halides, or mesylates as disclosed in commonly assigned U.S. patent application Ser. No. 07/957,929, filed on Oct. 7, 1992, or as disclosed in U.S. Pat. Nos. 3,666,726, 3,691,112 and 5,066,824.

Suitable polyacetals include the compounds which can be prepared from aldehydes, e.g. formaldehyde, and glycols such as diethylene glycol, triethylene glycol, ethoxylated 4,4'-dihydroxydiphenyl-dimethylmethane, and hexanediol-(1,6). Polyacetals suitable for the purpose of the invention may also be prepared by the polymerization of cyclic acetals.

Suitable polyhydroxy polyester amides and polyamines include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The low molecular weight material preferably containing two hydroxyl groups having an average molecular weight of 60 to 200 may be used in combination with or instead of the high molecular weight material containing two or more hydroxyl groups. The useful low molecular weight materials include the polyhydric alcohols which have previously been described for the preparation of the polyester polyols and polyether polyols. Dihydric alcohols are preferred. The weight ratio of the low molecular weight to the high molecular weight material containing about 1.8 or more hydroxyl groups can be from 0.001 to 2 and preferably 0.01 to 0.40.

In addition to the above-mentioned components, small amounts of monofunctional compounds may also be used.

In the process of the invention, the hydroxyl functional material(s) can be reacted with the diallophanate over the temperature range of 40 to 150 and preferably 50° to 100° C., over a period of time sufficient to complete the reaction. Catalysts and solvents can be employed to aid the reaction. Examples of the useful catalysts to promote the urethane reactions can be selected from the group consisting of di-n-butyltin dichloride, di-n-butyltin diacetate, di-n-butyltin dilaurate, triethylene-diamine, bismuth nitrate and the like.

Examples of the useful solvents can be selected from the group consisting of toluene, tetrahydrofuran, and chlorobenzene.

The resultant product of the first embodiment is a liquid isocyanate prepolymer having an isocyanate group content of 12 to 30%, preferably 17 to 28%, and most preferably 17 to 24%. The resultant product of the second embodiment is a liquid isocyanate prepolymer having an isocyanate group content of 5 to 29%, preferably 9 to 27%, and most preferably 12 to 21%. These liquid isocyanate prepolymers have been found to be particularly useful for preparing molded polyurethane articles via the RIM process which exhibit unique properties. More specifically, the molded parts have improved flex modulus.

The liquid isocyanate prepolymers compositions of the present invention may be further combined with one or more isocyanate-reactive compounds, a catalyst and any of the other known additives and processing aids which are known to be useful in RIM processes. This reactive mixture may then be molded in accordance with known reaction injection molding techniques.

Isocyanate-reactive compounds useful for producing the reactive mixture to be molded include those described above as being useful for the production of the liquid isocyanate prepolymers described previously. These suitable isocyanate-reactive materials include, for example, the polyethers, polyesters, polythioethers, polyacetals, polycarbonates, amine terminated polyethers, aminopolyethers, polymer polyols, PHD-polyols, or the so-called filled polyols. These compounds may have molecular weights of from about 500 to 10,000 and contain from 1 to 4 isocyanate-reactive groups of the type known for the production of polyurethanes.

Other isocyanate-reactive compounds useful for producing the reactive mixture to be molded include, for example, low molecular weight chain extenders. These compounds generally have molecular weights of from about 60 to 500, preferably from 61 to 400, and may contain either hydroxyl groups or amino groups which are reactive with the isocyanate. Suitable compounds include, for example, organic diols and triols, organic primary amines and secondary amines, aminoalcohols, etc. Some suitable amine chain extenders include 1-methyl-3,5-diethyl-2,4-phenyl diamine, 1-methyl-3,5-diethyl-2,6-phenyl diamine, and mixtures thereof.

Catalysts which may be used to produce RIM articles in accordance with the present invention include, for example, the tertiary amines, silylamines having carbon-silicon bonds, basic nitrogen compounds, and organic metal compounds such as for, example, organic tin compounds. Some suitable examples of these include those described in, for example, U.S. Pat. No. 5,198,522, the disclosure of which is herein incorporated by reference.

Other additives which may be used in the RIM process according to the present invention include surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described, for example, in U.S. Pat. No. 2,764,565. In addition to the catalysts and surface-active agents, other additives which may be used in the molding compositions of the present invention include known blowing agents including nitrogen, cell regulators, flame retarding agents, plasticizers, antioxidants, UV stabilizers, adhesion promoters, dyes, fillers and reinforcing agents such as glass in the form of fibers or flakes or carbon fibers.

It is also possible to use the known internal mold release agents, such as, for example, zinc stearate, in the RIM process of the invention. As is known to one of ordinary skill in the art, in the RIM process, an isocyanate, and active hydrogen containing compounds are mixed and injected into molds, wherein the reactants are allowed to react fully.

The molded products of the present invention are prepared by reacting the components in a closed mold via the RIM process. The compositions according to the present invention may be molded using conventional processing techniques at isocyanate indexes ranging from about 80 to 120 (preferably from 90 to 110). By the term "Isocyanate Index" (also commonly referred to as NCO index), is defined herein as the equivalents of isocyanate, divided by the total equivalents of isocyanate-reactive hydrogen containing materials, multiplied by 100.

The term "molecular weight" as used herein refers to the number average molecular weight of a material. A definition of number average molecular weight is set forth in "Principles of Polymer Chemistry" by Paul J. Flory, 1953, Cornell University, p. 35.

In general, in a RIM process, two separate streams are intimately mixed and subsequently injected into a suitable mold, although it is possible to use more than two streams. The first stream contains the polyisocyanate component, while the second stream contains the isocyanate reactive components and any other additive which is to be included.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

MDI-x: diphenylmethane diisocyanate which contains less than 6% by weight 2,2'-isomer of diphenylmethane diisocyanate and in which x represents the percent by weight 2,4'-isomer of diphenylmethane diisocyanate with the remainder being the 4,4' and 2,2'-isomers.

Polyol A: a propylene glycol/propylene oxide adduct having a molecular weight of 2,000 and a hydroxyl value of 56.

Polyol B: a glycerol started polyether of propylene oxide and ethylene oxide (83 wt % PO and 17 wt % EO) having an OH number of 35, and a primary OH content of approximately 90% based on the total OH content of the polyether polyol.

Isocyanate A

To 321 parts of MDI-2 at 60° C. was added 226 parts of 1-pentanol. The reaction mixture exothermed to 95° C. and the temperature was maintained between 95° and 120° C. for about 1 hour. To the thick liquid at 110° C. was added 1926 parts of MDI-20. 0.25 part of zinc acetylacetonate was added to the reaction mixture at 110° C. and this temperature was maintained at 110° C. for 2 hours giving a material with 21.9% NCO content. The reaction mixture was cooled to 60° C. and 0.75 part of benzoyl chloride was added. After stirring at 60° C. for 15 minutes 963 parts of Polyol A and 333 parts of Polyol B were added and the reaction mixture was held at 60° C. for 2 hours. The reaction mixture was then cooled to 25° C. to give a material with a 13.0% NCO and a viscosity at 25° C. of 6260 mPa.s.

Isocyanate B

To a stirred reactor containing 658 parts of 2,4-toluene diisocyanate (TDI) were added 1679 parts of 1-butanol at such a rate that the reaction temperature was maintained at 90° C. with cooling. 30 minutes after the addition was complete, no isocyanate peaks remained in the IR (infra-red) spectrum. The excess 1-butanol was removed by vacuum distillation to give 1218 parts of the diurethane of TDI. To this was added 6062 parts of MDI-2 and 1.1 parts zinc acetylacetonate. The reaction mixture was heated at 90° C. for 1 hour, cooled to 60° C. and 3.3 parts of benzoyl chloride was added. The clear light yellow liquid had an NCO content of 23.6%. To this was added 3409 parts of Polyol A and 1183 parts of Polyol B. The reaction mixture was held at 60° C.

for 2 hours then cooled to 25° C. The resulting prepolymer had an NCO content of 12.9% and a viscosity at 25° C. of 3710 mPa.s.

Isocyanate C (not in accordance with the invention)

654 parts of MDI-2 and 32 parts of 1-butanol were charged to a stirred reactor and heated to 60° C. 0.034 parts of zinc acetylacetonate were added and the stirred reaction mixture was heated to 90° C. After one hour at 90° C., the NCO content was 26.8%. The reaction mixture was cooled to 60° C. and 0.069 parts of benzoyl chloride were added. After stirring at 60° C. for 15 minutes, 144 parts of Polyol B and 420 parts of Polyol A were added and the reaction mixture was held at 60° C. for 2 hours. The reaction mixture was then cooled to 25° C. to yield a material containing 12.9% NCO and a viscosity at 25° C. of 2640 mPa.s.

Isocyanate D (not in accordance with the invention)

702 parts of MDI-2 and 40.7 parts of 1-butanol were charged to a stirred reactor and heated to 60° C. 0.037 parts of zinc acetylacetonate were added and the stirred reaction mixture was heated to 90° C. After one hour at 90° C., the NCO content was 25.7%. The reaction mixture was cooled to 60° C. and 0.087 parts of benzyl chloride were added. After stirring at 60° C. for 15 minutes, 142 parts of Polyol B and 415 parts of Polyol A were added and the reaction mixture was held at 60° C. for 2 hours. The reaction mixture was then cooled to 25° C. to yield a material containing 13.0% NCO and a viscosity at 25° C. of 2760 mPa.s.

RIM examples

Liquid isocyanate prepolymers prepared in accordance with the above examples (1–4) were used to produce reaction injected molded articles. The specific materials and the amounts of those materials used are reported in the Tables which follow. A description of the materials is set forth hereinbelow. The polyurethane-forming system was injected using a Hennecke RIMDOMAT RIM machine. The isocyanate-reactive materials and various additives were put into the B-side of the machine, and the appropriate quantities of the specific isocyanate to achieve an isocyanate index of 105 was loaded into the A-side. The RIMDOMAT was equipped with a Hennecke mq8 Mixhead. The B-side was preheated to 45° C. and the A-side was heated to 45° C. The materials were injected at a 105 isocyanate index at an injection pressure of 200 bar and an injection rate of 200 grams/sec. The material was injected into a flat plaque mold of 3×200×300 mm heated to 65° C. and sprayed with Chemtrend 2006 mold release spray. After a 30 second dwell time, the part was demolded. Physical properties were determined in accordance with ASTM standards. Other RIM examples were performed in an identical manner, except for the pbw of various components.

The following components were used in the RIM examples.

All RIM examples were performed at an NCO index of 105.

Isocyanate A: see description above

Isocyanate B: see description above

Isocyanate C: see description above

Isocyanate D: see description above

Polyol C: a glycerol started polyether of propylene oxide and ethylene oxide (83 wt % PO and 17 wt % EO) having an OH number of 35, and a primary OH content of approximately 90% based on the total OH content of the polyether polyol Amine A: a propoxylated ethylene diamine having an OH number of 630

Polyol D: a polyester having an OH number of 51, and based on oleic acid, adipic acid and pentaerythritol in about a 6:2:3 molar ratio IMR A: a blend of zinc stearate and Amine A in a 2:3 weight ratio, and having an OH number of 378

DETDA: an 80:20 mixture of 1-methyl-3,5-diethyl-2,4- and 2,6-phenyl diamine

L-5304: a silicone surfactant available from Union Carbide Corp.

UL-28: dimethyl tin dilaurate

Dabco 33-LV: 33 wt % of triethylene diamine in dipropylene glycol with an OH# of 559

Isocyanates A and B show the advantages of the diallophanate modification, and Isocyanates C and D are comparative monoallophanate examples. In the examples according to the invention, there is a marked improvement in flex modulus at a given DETDA level. This is true in spite of the fact that the comparative isocyanates have the highest moles of allophanate modification per 100 g. of isocyanate. The other properties are essentially similar. However, brittleness is not a problem with any of these elastomers as all impacts are well above the 3 to 5 ft. lb./in. level. The ability to greatly enhance the hardness with a good balance of elastomer properties has two key advantages. The first is cost. DETDA is the most costly of all the raw materials in these formulations. This approach allows us to achieve higher flexural moduli with less DETDA through appropriate formulation of the prepolymer. This translates directly into cost savings. The second is reactivity reduction. Lower DETDA levels means lower concentrations of the fast reacting amines which give rise to slower systems, even at high flexural moduli. This allows the filling of larger molds on a given RIM machine and the reduction of density gradients and other reactivity related production problems.

TABLE 1

| | RIM EXAMPLE | | | |
|---|---|---|---|---|
| | 1 | 2 | 3 | 4 |
| DETDA | 30 | 30 | 30 | 30 |
| POLYOL D | 3.8 | 3.8 | 3.8 | 3.8 |
| IMR A | 3 | 3 | 3 | 3 |
| L-5304 | 0.4 | 0.4 | 0.4 | 0.4 |
| AMINE A | 1.7 | 1.7 | 1.7 | 1.7 |
| POLYOL C | 60.5 | 60.5 | 60.5 | 60.5 |
| UL-28 | 0.3 | 0.3 | 0.3 | 0.3 |
| Dabco 33-LV | 0.1 | 0.1 | 0.1 | 0.1 |
| Isocyanate | A | B | C | D |
| % NCO | 13.0 | 12.9 | 12.9 | 13.0 |
| Moles Allophanate/100 g | 0.0341 | 0.0317 | 0.0346 | 0.0424 |
| RT Flex Mod (psi) | 55,600 | 52,300 | 34,400 | 36,400 |
| Heat Sag (6"/250° F.) | 29 | 28 | 32 | 22 |
| Heat Sag (4"/325° F). | 38 | 34 | 47 | 47 |
| Notched Izod (ft lb/in) | 12.6 | 11.4 | 10.3 | 9.4 |
| Elongation (%) | 220 | 260 | 265 | 280 |
| Tensile Strength (psi) | 4,000 | 4,600 | 4,000 | 4,200 |
| Tear Strength (pli) | 540 | 530 | 520 | 510 |

TABLE 2

| | RIM EXAMPLE | | | |
|---|---|---|---|---|
| | 5 | 6 | 7 | 8 |
| DETDA | 35 | 35 | 35 | 35 |
| POLYOL D | 3.8 | 3.8 | 3.8 | 3.8 |
| IMR A | 3 | 3 | 3 | 3 |
| L-5304 | 0.4 | 0.4 | 0.4 | 0.4 |
| AMINE A | 2.2 | 2.2 | 2.2 | 2.2 |
| POLYOL C | 55.2 | 55.2 | 55.2 | 55.2 |
| UL-28 | 0.2 | 0.2 | 0.2 | 0.2 |
| Dabco 33-LV | 0.2 | 0.2 | 0.2 | 0.2 |
| Isocyanate | A | B | C | D |
| % NCO | 13.0 | 12.9 | 12.9 | 13.0 |
| Moles Allophanate/ 100 g | 0.0341 | 0.0317 | 0.0346 | 0.0424 |
| RT Flex Mod (psi) | 71,500 | 66,500 | 46,800 | 49,600 |
| Heat Sag (6"/250° F.) | 22 | 21 | 23 | 20 |
| Heat Sag (4"/325° F.) | 34 | 26 | 39 | 37 |
| Notched Izod (ft lb/in) | 8.8 | 9.2 | 11 | 11.3 |
| Elongation (%) | 185 | 210 | 290 | 285 |
| Tensile Strength (psi) | 4,300 | 4,530 | 4,630 | 5,200 |
| Tear Strength (pli) | 570 | 560 | 585 | 635 |

TABLE 3

| | RIM EXAMPLE | | | |
|---|---|---|---|---|
| | 9 | 10 | 11 | 12 |
| DETDA | 40 | 40 | 40 | 40 |
| POLYOL D | 4.3 | 4.3 | 4.3 | 4.4 |
| IMR A | 3.4 | 3.4 | 3.4 | 3.4 |
| L-5304 | 0.4 | 0.4 | 0.4 | 0.4 |
| AMINE A | 2.5 | 2.5 | 2.5 | 2.5 |
| POLYOL C | 49.1 | 49.1 | 49.1 | 49.1 |
| UL-28 | 0.2 | 0.2 | 0.2 | 0.2 |
| Dabco 33-LV | 0.3 | 0.3 | 0.3 | 0.3 |
| Isocyanate | A | B | C | D |
| % NCO | 13.0 | 12.9 | 12.9 | 13.0 |
| Moles Allophanate/ 100 g | 0.0341 | 0.0317 | 0.0346 | 0.0424 |
| RT Flex Mod (psi) | 84,300 | 79,600 | 59,200 | 63,500 |
| Heat Sag (6"/250° F.) | 14 | 13 | 15 | 20 |
| Heat Sag (4"/325° F.) | 22 | 20 | 29 | 32 |
| Notched Izod (ft lb/in) | 7.9 | 9.0 | 11.6 | 12.2 |
| Elongation (%) | 170 | 175 | 265 | 250 |
| Tensile Strength (psi) | 4,400 | 4,500 | 4,760 | 4,400 |
| Tear Strength (pli) | 610 | 630 | 660 | 665 |

| ASTM Tests | |
|---|---|
| Property | ASTM Test Number |
| Heat Sag | D-3768 |
| Flex Modulus | D-790 |
| Notched Izod | D-256 |
| Elongation | D-638 |
| Tensile Strength | D-638 |
| Tear Strength | D-624 |

Although the invention has been described in detail in the foregoing for the purpose of illustration, it is to be understood that such detail is solely for that purpose and that variations constituting other embodiments can be made therein by those skilled in the art without departing from the spirit and scope of the invention except as it may be limited by the claims.

What is claimed is:

1. A process for producing a molded article via the reaction injection molding (RIM) technique by introducing a reaction mixture into a closed mold, wherein said reaction mixture has an isocyanate index of from about 80 to 120 and said reaction mixture comprises:

A) an isocyanate-reactive material,
B) a chain extender, and
C) a stable, liquid diallophanate-modified diphenylmethane diisocyanate prepared by either:
1) (a) reacting
(i) one equivalent of a diisocyanate, with
(ii) one equivalent of an aliphatic alcohol containing 1 to 36 carbon atoms or aromatic alcohol containing 6 to 18 carbon atoms wherein the hydroxyl group is directly attached to the aromatic ring to form a diurethane of the diisocyanate,
(b) reacting said diurethane with a diphenylmethane diisocyanate isomer composition comprising about 0 to 60% by weight of 2,4'-diphenylmethane diisocyanate and less than 6% by weight of 2,2'-diphenylmethane diisocyanate with the remainder being 4,4'-diphenylmethane diisocyanate, in the presence of an allophanate catalyst to yield said stable, liquid diallophanate-modified diphenylmethane diisocyanate, followed by the addition of a catalyst stopper,
wherein said stable, liquid diallophanate-modified diphenylmethane diisocyanate has an isocyanate group content of from 12.0 to 30.0%; or
(a) reacting
(i) one equivalent of a diisocyanate, with
(ii) one equivalent of an aliphatic alcohol containing 1 to 36 carbon atoms or aromatic alcohol containing 6 to 18 carbon atoms to form a diurethane of the diisocyanate,
(b) reacting said diurethane with a diphenylmethane diisocyanate isomer composition comprises about 0 to 60% by weight of 2,4'-diphenylmethane diisocyanate and less than 6% by weight of 2,2'-diphenylmethane diisocyanate with the remainder being 4,4'-diphenylmethane diisocyanate, in the presence of an allophanate catalyst to yield a diallophanate-modified diphenylmethane diisocyanate having an isocyanate group content of from 12.0 to 30%, followed by the addition of a catalyst stopper, and
(c) reacting said diallophanate-modified diphenylmethane diisocyanate having an isocyanate group content of from 12.0 to 30.0%, with at least one compound selected from the group consisting of: (i) an organic material containing about 1.8 or more hydroxy, primary amine or secondary amine groups or any combination thereof, having a molecular weight of from 400 to 6000, (ii) a diol having a molecular weight of from 60 to 200 and (iii) mixtures of (i) and (ii), to form said stable, liquid diallophanate modified isocyanate wherein said diallophanate-modified isocyanate has an isocyanate group content of from 5 to 29%;

allowing said reaction mixture to fully react, and removing the molded article from the mold.

2. The process of claim 1, wherein said aliphatic alcohol contains from 2 to 16 carbon atoms.

3. The process of claim 1, wherein said aromatic alcohol is a phenol or a substituted phenol.

4. The process of claim 1, wherein said diisocyanate is selected from the group consisting of toluene diisocyanate, methylene bis(phenyl isocyanate), and 1,6-hexamethylene diisocyanate.

5. The process of claim 1, wherein said diol is selected from the group consisting of 1,2-propanediol, 1,3-butanediol, diethylene glycol, triethylene glycol, tripropylene glycol, and dipropylene glycol.

6. The process of claim 1, wherein said organic material containing about 1.8 or more hydroxy, primary amine or secondary amine groups or mixtures thereof, has a molecular weight of 1000 to 4800 and a functionality of from about 2 to 3.

7. The process of claim 1, wherein said isocyanate index is from 90 to 110.

8. The process of claim 1, wherein said stable, liquid diallophanate modified diphenylmethane diisocyanate prepared by method 1) has an isocyanate group content of from 17 to 28%.

9. The process of claim 8, wherein said stable, liquid diallophanate modified diphenylmethane diisocyanate has an isocyanate group content of from 17 to 24%.

10. The process of claim 1, wherein said stable, liquid diallophanate modified diphenylmethane diisocyanate prepared by method 2) has an isocyanate group content of from 9 to 27%.

11. The process of claim 10, wherein said stable, liquid diallophanate modified diphenylmethane diisocyanate has an isocyanate group content of from 12 to 21%.

12. The process of claim 1, wherein said diphenylmethane diisocyanate isomer composition comprising about 0 to 30% by weight of 2,4'-diphenylmethane diisocyanate and less than 3% by weight of 2,2'-diphenylmethane diisocyanate with the remainder being 4,4'-diphenylmethane diisocyanate.

13. The process of claim 12, wherein said diphenylmethane diisocyanate isomer composition comprising about 0 to 10% by weight of 2,4'-diphenylmethane diisocyanate and less than 1% by weight of 2,2'-diphenylmethane diisocyanate with the remainder being 4,4'-diphenylmethane diisocyanate.

* * * * *